United States Patent
Mancilla Montiel et al.

(10) Patent No.: US 11,586,212 B2
(45) Date of Patent: Feb. 21, 2023

(54) VEHICLE DEVICE LOCALIZATION

(71) Applicant: Ford Global Technologies, LLC, Dearborn, MI (US)

(72) Inventors: Miguel Mancilla Montiel, Canton, MI (US); Tamaira Tibisay Linares Becerra, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 382 days.

(21) Appl. No.: 16/794,277

(22) Filed: Feb. 19, 2020

(65) Prior Publication Data

US 2021/0255634 A1    Aug. 19, 2021

(51) Int. Cl.
| | | |
|---|---|---|
| H04W 4/02 | (2018.01) | |
| G05D 1/02 | (2020.01) | |
| H04W 4/44 | (2018.01) | |
| G05D 1/00 | (2006.01) | |
| G01S 5/06 | (2006.01) | |
| G01S 5/02 | (2010.01) | |
| G06N 3/04 | (2023.01) | |
| G06N 3/08 | (2023.01) | |
| G01S 5/14 | (2006.01) | |

(52) U.S. Cl.
CPC .......... *G05D 1/0221* (2013.01); *G01S 5/0278* (2013.01); *G01S 5/06* (2013.01); *G01S 5/14* (2013.01); *G05D 1/0088* (2013.01); *G06N 3/04* (2013.01); *G06N 3/08* (2013.01); *H04W 4/023* (2013.01); *H04W 4/44* (2018.02); *G05D 2201/0213* (2013.01)

(58) Field of Classification Search
CPC .............. G05D 1/0221; G05D 1/0088; G05D 2201/0213; H04W 4/44; H04W 4/023; G01S 5/0278; G01S 5/06; G01S 5/14; G06N 3/04; G06N 3/08
See application file for complete search history.

(56) References Cited

U.S. PATENT DOCUMENTS

| | | | |
|---|---|---|---|
| 8,130,076 B2 | 3/2012 | Nakajima et al. | |
| 9,182,473 B2 | 11/2015 | Margalef et al. | |
| 10,123,297 B1* | 11/2018 | Harney | G01C 21/3664 |
| 10,285,013 B2 | 5/2019 | Ledvina et al. | |
| 11,037,328 B1* | 6/2021 | Marschner | G06T 7/564 |

(Continued)

FOREIGN PATENT DOCUMENTS

| | | |
|---|---|---|
| CN | 107124696 A | 9/2017 |
| JP | 2008138463 A | 6/2008 |

*Primary Examiner* — Dai Phuong
(74) *Attorney, Agent, or Firm* — Frank Lollo; Bejin Bieneman PLC

(57) ABSTRACT

A computer, including a processor and a memory, the memory including instructions to be executed by the processor to determine a plurality of received signal strength indicators or time of flight values for a mobile device from each of a plurality of sensors included in a vehicle, determine a location of the mobile device with respect to the vehicle by processing the received signal strength indicators or time of flight values with a neural network wherein each received signal strength indicator is input to an input neuron included in an input layer of the neural network wherein each input neuron inputs at least one received signal strength indicator or time of flight value, and operate the vehicle using the located mobile device.

20 Claims, 4 Drawing Sheets

(56) References Cited

U.S. PATENT DOCUMENTS

| | | | |
|---|---|---|---|
| 2019/0266418 A1* | 8/2019 | Xu ........................ | G05D 1/0221 |
| 2019/0378363 A1* | 12/2019 | Becker ................. | G07C 5/0841 |
| 2021/0072341 A1* | 3/2021 | Bocca ................... | H04W 4/029 |
| 2021/0146884 A1* | 5/2021 | Wang ...................... | G01S 11/06 |
| 2022/0022719 A1* | 1/2022 | Kwak ................. | G05D 1/0282 |
| 2022/0169206 A1* | 6/2022 | Moeller ............... | G06F 21/572 |

* cited by examiner

VEHICLE DEVICE LOCALIZATION

BACKGROUND

Vehicles can be equipped with computing devices, networks, sensors and controllers to acquire data regarding the vehicle's environment and to operate the vehicle based on the data. Vehicle sensors can provide data about a vehicle's environment, e.g., concerning routes to be traveled and objects to be avoided in the vehicle's environment.

DETAILED DESCRIPTION

Figure 1:
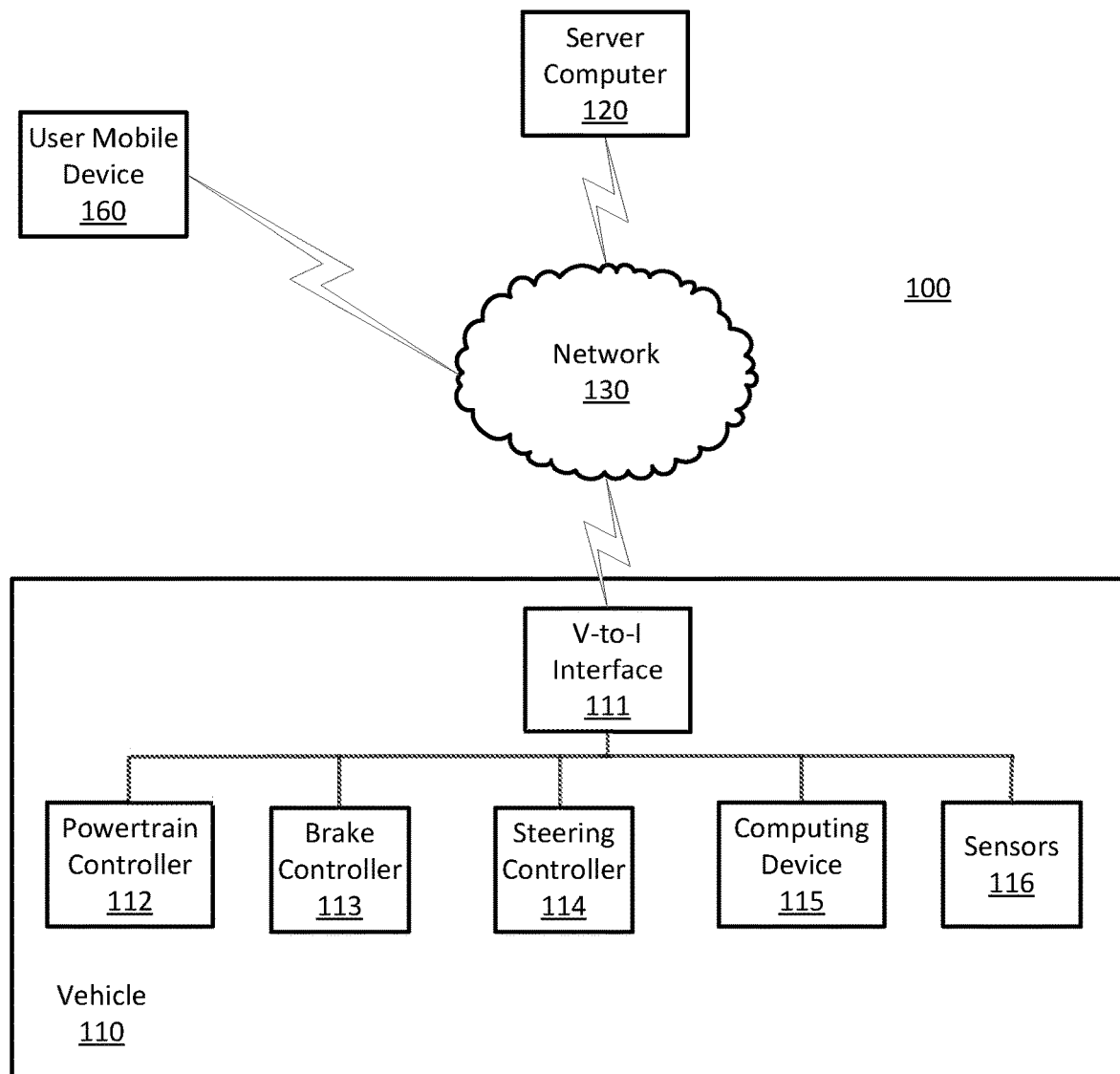
FIG. 1 is a diagram of an example traffic infrastructure system.

Vehicles can be equipped to operate in autonomous and/or occupant piloted modes. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A vehicle can receive data from an occupant or potential occupant via a mobile device. A mobile device can be a smart phone, a tablet computing device, or a wireless activation device, such as is commonly referred to as a "key fob". A wireless activation device is a hardware device including a processor, a memory, and circuitry for short-range wireless communications with a vehicle. A smart phone, tablet or wireless activation device can include a wireless communication interface that can communicate with a computing device in a vehicle via a wireless communication protocol. The vehicle can receive data from the mobile device and based on the data perform tasks related to the occupant or potential occupant. The tasks can include unlocking a door, opening a tailgate, or turning on interior and/or exterior vehicle lights, for example.

Disclosed herein is method including determining a plurality of received signal strength indicators or time of flight values for a mobile device from each of a plurality of sensors included in a vehicle, determining a location of the mobile device with respect to the vehicle by processing the received signal strength indicators or time of flight values with a neural network, wherein each received signal strength indicator or time of flight value is input to an input neuron included in an input layer of the neural network wherein each input neuron inputs at least one received signal strength indicator or time of flight value and operating the vehicle using the located mobile device. Each of the sensors can include an antenna located at a position on and in the vehicle. The neural network can output a 3D distance as a zone and a probability that the mobile device is in the zone, wherein the zone is a 3D volume defined with respect to the 3D locations of the antennas. The neural network can output two or more zones and corresponding probabilities. Each input neuron can input one and only one received signal strength indicator or time of flight value. An input neuron can input two or more received signal strength indicators or time of flight values based on the two or more received signal strength indicators or time of flight values including highly correlated signals. Intermediate layers of the neural network can include intermediate neurons that map data from the input neurons into a three-dimensional location based on polynomial functions based on received signal strength indicators or time of flight values.

The polynomial functions can be based on one or more of inverse-square law functions that determine distances based on the received signal strength indicators or simultaneous linear equations based on time of flight values. The received signal strength indicators can be determined by transmitting a signal requesting a reply to the mobile device and measuring a signal received from the mobile device in reply. The neural network can be trained by acquiring a data set including a plurality of received signal strength indicators from the plurality of sensors and corresponding ground truth data regarding the location of the mobile device wherein the ground truth data includes a location in three-dimensional space of the mobile device with respect to the vehicle. The plurality of sensors can be optimized by determining an accuracy of the determined location compared to corresponding ground truth data when one or more of the sensors are deleted from the neural network processing. Operating the vehicle can include one or more of turning on vehicle lights and unlocking the vehicle, and opening a tailgate when the mobile device is determined to be within a specified distance from the vehicle. Operating the vehicle can include disabling a lock of the vehicle when the mobile device is determined to be inside the vehicle. Operating the vehicle can include locking the vehicle when the mobile device is determined to be more than a specified distance away from the vehicle.

Further disclosed is a computer readable medium, storing program instructions for executing some or all of the above method steps. Further disclosed is a computer programmed for executing some or all of the above method steps, including a computer apparatus, programmed to determine a plurality of received signal strength indicators for a mobile device from each of a plurality of sensors included in a vehicle, determine a location of the mobile device with respect to the vehicle by processing the received signal strength indicators or time of flight values with a neural network, wherein each received signal strength indicator or time of flight value is input to an input neuron included in an input layer of the neural network wherein each input neuron inputs at least one received signal strength indicator or time of flight value and operate the vehicle using the located mobile device. Each of the sensors can include an antenna located at a position on and in the vehicle. The neural network can output a 3D distance as a zone and a probability that the mobile device is in the zone, wherein the zone is a 3D volume defined with respect to the 3D locations of the antennas. The neural network can output two or more zones and corresponding probabilities. Each input neuron can input one and only one received signal strength indicator or time of flight value. An input neuron can input two or more received signal strength indicators or time of flight values based on the two or more received signal strength indicators or time of flight values including highly correlated signals. Intermediate layers of the neural network can include intermediate neurons that map data from the input neurons into a three-dimensional location based on polynomial functions based on received signal strength indicators or time of flight values.

The computer can be further programmed to determine polynomial functions based on inverse-square law functions that determine distances based on the received signal strength indicators. The received signal strength indicators can be determined by transmitting a signal requesting a reply to the mobile device and measuring a signal received from the mobile device in reply. The neural network can be trained by acquiring a data set including a plurality of received signal strength indicators or time of flight values from the plurality of sensors and corresponding ground truth data regarding the location of the mobile device wherein the ground truth data includes a location in three-dimensional space of the mobile device with respect to the vehicle. The plurality of sensors can be optimized by determining an accuracy of the determined location compared to corresponding ground truth data when one or more of the sensors are deleted from the neural network processing. Operating the vehicle can include one or more of turning on vehicle lights and unlocking the vehicle, and opening a tailgate when the mobile device is determined to be within a specified distance from the vehicle. Operating the vehicle can include disabling a lock of the vehicle when the mobile device is determined to be inside the vehicle. Operating the vehicle can include locking the vehicle when the mobile device is determined to be more than a specified distance away from the vehicle.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH®, ultra-wideband and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160. Server computer 120 can also function as a computing device 115 included in a roadside infrastructure, or edge, computing node, where an edge computing node is a computing device 115 included in or on a stationary infrastructure element such as a pole, a bridge, a wall, etc., and that acquires sensor data and communicates with vehicles 110 via Dedicated Short Range Communications (DSRC) or the like in a local portion of one or more of a roadway, parking lot or parking structure, etc.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
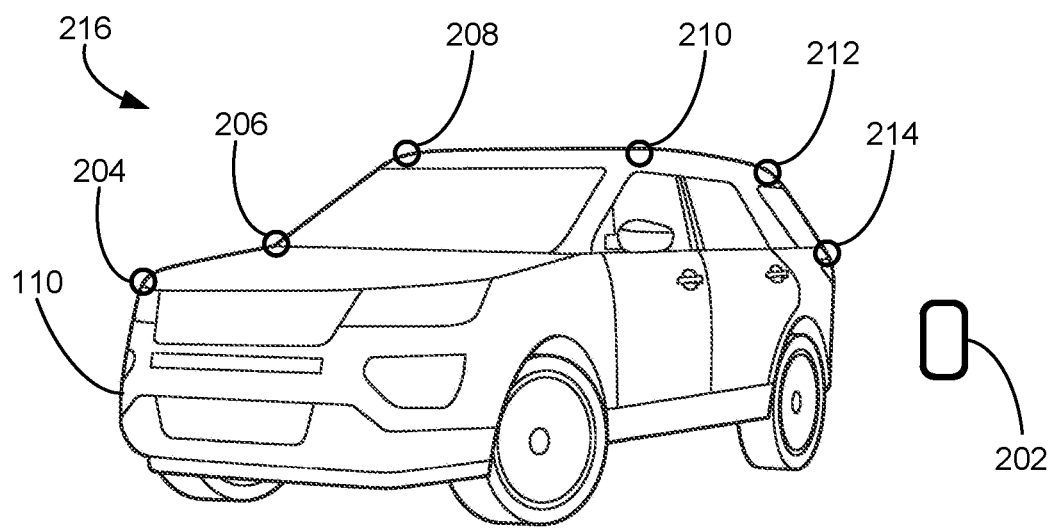
FIG. 2 is a diagram of an example vehicle with sensors.

FIG. 2 is a diagram of a vehicle 110 and a mobile device 202. The mobile device 202 can include a wireless communication interface that communicates with a computing device 115 in the vehicle 110 via a wireless protocol which can include DSRC, BLUETOOH, WiMAX, or ultra-wideband for example, as discussed above in relation to FIG. 1. The mobile device 202 communicates with the computing device 115 in the vehicle 110 directly, where wireless signals are communicated between the mobile device 202 and the vehicle 110 without passing through a network 130 such as a cellular phone network or a WI-FI network. Because the signal from the mobile device 202 is acquired directly by the computing device 115, the computing device 115 can use a plurality of antennas 204, 206, 208, 210, 212, 214 (collectively antennas 216), denoted by circles in FIG. 2, to determine a location of the mobile device 202 with respect to the vehicle 110.

The mobile device 202 is a computing device that can be used while carried by a user and can be, e.g., a smart phone, a tablet computing device or a wireless activation device. The mobile device 202 can include a wireless communication interface that can communicate with a computing device 115 in a vehicle 110. The mobile device can communicate with the computing device 115 via a radio or electromagnetic wireless communication signal as discussed above in relation to FIG. 1. Mobile device 202 is typically carried by an occupant and can be used to communicate with the computing device 115. For example, a mobile device 202 could be used for keyless entry of a vehicle 110. When a computing device 115 included in a vehicle 110 determines that a mobile device 202 is within a specified distance from the vehicle 110, for example one meter, the computing device 115 can unlock one or more vehicle doors. Another operation that could be performed by the computing device 115 based on determining that a mobile device 202 is within a specified distance includes turning on courtesy lights. Yet another operation that could be performed is to prevent locking of vehicle 110 doors when the computing device determines that the mobile device 202 is inside the vehicle 110, preventing the mobile device 110 from being locked inside the vehicle 110.

A computing device 115 can determine whether a mobile device 202 is within a specified distance from a vehicle 110 by determining a received signal strength indicator (RSSI). An RSSI is a measure of the strength or amplitude of a received wireless signal. Wireless signals are typically transmitted as an electromagnetic carrier wave at a particular frequency, which is can be a radio frequency in the range from 300 MHz to 300 GHz, for example. The carrier wave is then modulated by phase and/or frequency shifting to encode data into the carrier wave. A wireless receiver demodulates the phase and/or frequency shift to extract data from the carrier wave. The carrier wave can be rectified and averaged over a specified time period, for example one microsecond, to determine an RSSI.

An RSSI is a function of the distance between the mobile device 202 emitting a signal including a carrier wave and the antenna 216 receiving the signal and the emitted signal strength. The emitted signal strength is determined by factors including battery strength of the mobile device 202, orientation of a transmitting antenna included in the mobile device 202 and proximity of the mobile device 202 to a radio frequency absorber such as a human body. Acquiring two or more RSSI measures from two or more antennas 216 can permit a computing device to determine an absolute measure of distance to a mobile device 202 in spite of variations in absolute signal strength by forming ratios between the measured RSSIs from the two or more antennas 216 and factoring in a previously measured distance between the two or more antennas.

An absolute measure of distance is possible to determine based on relative RSSIs from two or more antennas 216 because radio frequency emissions from a mobile device 202 generally obey an inverse-square law regarding signal strength. Signals from a mobile device 202 can be modeled as being emitted from a point source and decrease proportional to the square of the distance traveled. The measured signal strength $RSSI_1$ at a given distance $d_1$ from a first antenna 216 the mobile device 202 is proportional to the area of a sphere at a radius equal to $d_1$, where $d_1$ is a vector distance measured in spatial coordinates x, y, and z.

$$RSSI_1 \propto \frac{1}{d_1^2} \qquad (1)$$

A proportionality constant p can be determined empirically by measuring RSSI signal strengths for the antennas 216 based on a mobile device 202 emitting radiation at its operating radio frequency to yield equation (2):

$$RSSI_1 = p\frac{1}{d_1^2} \qquad (2)$$

A ratio measured signal strengths $RSSI_1$, $RSSI_2$ at distances $d_1$, $d_2$ to a second antenna 216 from the mobile device 202 is equal to the ratio of the distances:

$$\frac{RSSI_1}{RSSI_2} = \frac{d_1^2}{d_2^2} \qquad (3)$$

Because the vector distance $d_{1,2}$ from a first antenna 216 to a second antenna 216 is a measured constant, the distance $d_2 = d_1 + d_{1,2}$, therefore:

$$\frac{RSSI_1}{RSSI_2} = \frac{d_1^2}{(d_1 + d_{1,2})^2} \qquad (4)$$

Solving for $d_1$ as a function of $RSSI_1$, $RSSI_2$, and $d_{1,2}$ yields:

$$d_1 = \frac{d_{1,2}}{\left(\sqrt{\frac{RSSI_2}{RSSI_1}} - 1\right)} \qquad (5)$$

For a given 3D location of a mobile device 202, a set of n values $RSSI_1, \ldots, RSSI_n$ for n antennas 216 at vector distances $d_{1,2}, \ldots, d_{1,n}$ from a first antenna can be measured. These measurements can be expressed as a set of n polynomial functions corresponding to n simultaneous linear equations variables based on equation (5). A 3D location for a mobile device 202 can be determined by finding a value of $d_1$ that simultaneously satisfies at least three equations (5) that include RSSIs from at least four antennas 216. At least three equations that include at least four RSSIs are required because vector distance $d_1$ includes three variables for distances in x, y, and z. Including RSSIs for more than four antennas 216 overdetermines the simultaneous linear equations and permits more accurate solutions for $d_1$, the 3D location for the mobile device 202 from a particular antenna 216.

Ultra-wide band (UWB) permits the determination of distance $d_1$ from a mobile device 202 to an antenna 216 directly by measuring time of flight (TOF). For example, TOF can be measured by emitting a pulse of UWB energy from a mobile device and measuring the arrival time at a plurality of antennas 216. This technique requires that all of the antennas 216 be time-synchronized to permit the antennas 216 to each accurately time-stamp the arrival time of the pulse emitted from the mobile device 202. Because UWB electromagnetic radiation travels at the speed of light (about $3.0 \times 10^8$ m/s), meaning that a UWB pulse travels about 30 cm or about one foot in one nanosecond. This means that the antennas 216 will be required to time-stamp the arrival time of a pulse with sub-nanosecond resolution to determine a distance to a mobile device 202 to within a few cm. For example, a time stamp resolution of 330 picoseconds will yield a distance resolution of 10 cm.

Another technique for determining distance from UWB based on TOF is to modulate the UWB signal and determine a phase difference between receiving antennas 216 to determine relative distances $d_n$ to a plurality of antennas 216. Whether the distances $d_n$ are determined by pulse arrival time or phase difference, the distance measurements can be expressed as a series of simultaneous linear equations based on the 3D location of the mobile device, where the locations of the antennas 216 are expressed as displacements from a single antenna 216 and the distance calculated as a 3D distance $d_1$ from a single antenna similarly to equations (1) to (5). In this example the distances are not determined by inverse square law as determined by RSSI, but directly as distances based on TOF. Time or flight values determined using either pulse arrival time or phase differences will be referred to as "TOF" herein.

Determining a 3D location for a mobile device 202 by solving simultaneous linear equations can be a very complex task that requires substantial computing resources. Techniques used to solve the simultaneous linear equations include for example matrix inversions. Matrix inversions require or iterative techniques all include a large number (>100) of calculations proportional to the third power of the number of elements in the matrix to be inverted. For this reason, matrix inversions require a large number of calculations to complete. Because the magnitude of RSSI or TOF values acquired from antennas 216 can vary greatly depending upon the 3D location of the mobile device 202, the RSSI or TOF values will vary from very small numbers close to zero to large numbers close to a maximum value. Performing a large number of calculations with widely varying values where some are close to zero and others are large numbers, also termed ill-conditioned, can be numerically unstable and lead to inaccurate results.

Other techniques for solving simultaneous linear equations include iterative techniques where the linear equations are solved repeatedly and the change in results at each step are compared the previous step to determine when the results are converging. Like matrix inversions, iterative techniques include a large number of calculations that depend upon combining very small values near zero with larger values, thereby leading to numerical instability and inaccurate results. Attempting to solve simultaneous linear equations based on a plurality of RSSIs or TOFs can require a large number of calculations (>1000 s) based on ill-conditioned input values that can require large amounts of time and computational resources and yield inaccurate results.

Determining a 3D location for a mobile device 202 can depend upon which antenna 216 is selected as the antenna 216 from which to measure the distance $d_1$ and therefore the 3D location of the mobile device 202 from. If the antenna 216 selected is on the opposite side of the vehicle 110 from the mobile device 202, for example, the measured RSSI or TOF can be weak. A weak RSSI will and produce a small value, while a weak TOF signal can produce a noisy, inaccurate signal, making the calculations inaccurate. A plurality of different antennas can be used as the primary antenna to solve simultaneous linear equations for distance $d_1$ and therefore the 3D location of the mobile device 202. Selecting multiple antennas 216 and calculating multiple solutions to multiple simultaneous linear equations increases the required computing resources and computing time required to determine the solutions. Determining a 3D location for a mobile device 202 by solution of simultaneous linear equations can be inaccurate and require substantial computing resources and time.

A technique for determining a 3D location for a mobile device that does not require solving simultaneous linear equations is to use rule-based machine learning techniques based on heuristic techniques. A heuristic technique uses empirical results to formulate rules that can be used to determine an approximate 3D location for a mobile device 202. Heuristic techniques can be implemented as a plurality of rules in a rule-based machine learning system. A plurality of rules in a rule-based machine learning system can be used to determine an approximate 3D location for a mobile device 202 by measuring a plurality of can be included in a rule-based machine learning system. Each rule in the rule-based machine learning system can input one or more RSSIs from one or more antennas 216 to determine possible 3D locations for a mobile device 202.

A first step in determining an approximate 3D location of a mobile device 202 can be to normalize the received RSSIs or TOFs. For example, a maximum received signal can be normalized to the value 1.0 and the other RSSIs or TOFs can be normalized to a value between 0.0 and 1.0 by dividing them by the received signal value of the maximum received RSSI or TOF. Rules in the rule-based system can then determine the 3D location for a mobile device 202 based on logical combinations of received RSSIs or TOFs. For example, a rule in a rule-based system can be "IF (antenna 210 RSSI or TOF>0.6 AND antenna 212 RSSI or TOF>0.6 AND antenna 214>0.4 AND antenna 204<0.4 AND antenna 206<0.4 AND antenna 208<0.4) THEN mobile device 202 location=near left-hand front door". A second rule in the rule-based system can then determine a more accurate distance from vehicle to the mobile device by combining the output from the first rule with a rule that states: "IF (any RSSI or TOF>0.8) THEN mobile device 202<1 meter from vehicle 110." Combining the 3D location from a first rule with the 3D location from a second rule can determine that the mobile device 202 is likely to be located less than one meter from the left-hand front door of a vehicle 110. In this fashion, multiple rules in a rule-based machine learning system can be combined to accurately determine a 3D location for a mobile device 202.

Determining rules for a rule-based system to locate a mobile device 202 includes acquiring RSSIs or TOFs from an example mobile device 202 for each antenna 216 at a large number (>100) locations around a vehicle 110 to determine the correct parameters to enter into a plurality of rules. Acquiring a large number of RSSIs or TOFs for a plurality of antennas 216 at a plurality of 3D locations around a vehicle 110 can estimate a 3D location for a mobile device 202 without requiring solving simultaneous linear equations, because the test data empirically determines 3D locations corresponding to RSSI values. Determining rules for the rule-based system can include acquiring RSSIs from a mobile device 202 at a large number (>100) locations around a vehicle and encoding the RSSI signals into rules in the rule-based system to determine correct results regarding the 3D location of the mobile device 202.

Producing rules that correctly determine mobile device 202 3D locations can a difficult task to perform, requiring a large amount of trial and error. Each new or newly modified rule has to be tested against every other rule in the rule-based system to check for inconsistent or contradictory behavior. Checking each new or newly modified rule against every other rule in the rule-based system can require computing resources and time proportional to an exponential power of the number of rules. For example, two rules can produce contradictory or inconsistent 3D locations for different sets of RSSI or TOF signals from a mobile device 202 at different locations. Contradictory or inconsistent 3D locations include multiple or ambiguous 3D locations where only one 3D location is correct. Each rule in the rule-based system has to be examined for each mobile device 202 location during testing to ensure that contradictory or inconsistent 3D locations are not produced in response to a single 3D location of a mobile device 202. When contradictory or inconsistent 3D locations are produced, the rules have to be modified or replaced with new rules to reduce contradictory or inconsistent results.

Determining 3D locations for a mobile device 202 based on rules can require a large number of rules, where each antenna 216 can require a plurality of rules based on a plurality of possible 3D locations of the mobile device 202. As the plurality of rules for each antenna 216 are determined, each new rule will then have to be tested against every other rule in the rule-based system. Addition or modification of a single rule can require modifications of each other rule in the system and then require that each newly modified rule be tested against each other rule in an iterative process. This iterative process can require that each rule be modified and re-tested a number of times proportional to the number of rules in the system, thereby making the amount of computing resources and time required to determine a rule-based system proportional to an exponential value of the number of rules in the system.

Techniques described herein improve determination of a 3D location of a mobile device 202 with respect to a vehicle based on RSSIs or TOFs from a plurality of antennas 216 by inputting a large number of RSSIs or TOFs acquired at a large number (>100) locations of a mobile device 202 into a neural network. The neural network can be trained to determine a 3D location for a mobile device 202 based on solving simultaneous linear equations based on input RSSIs or TOFs from a plurality of antennas 216. Once the neural network is trained to solving the simultaneous linear equations in this fashion, a 3D location can be determined in far fewer computational steps than either matrix inversion or iterative techniques. The neural network can be trained to determine a 3D location for a mobile device 202 in far less than exponential time, in contrast to rule-based machine learning systems. Adding new data regarding an additional 3D location of a mobile device 202 can be performed without full retraining of the neural network, unlike rule-based systems. Neural network systems can determine 3D locations of mobile devices 202 based on a plurality of RSSIs or TOFs from a plurality of antennas far more efficiently than either matrix inversion and iterative techniques or rule-based machine learning techniques.

The trained neural network can also be used to optimize the plurality of antennas 216 by deleting outputs from each antenna 216 in turn and comparing the resulting 3D location to the 3D location determined based on the full number of antennas 216. If the 3D location results do not change significantly with an RSSI or TOF deleted, then the antenna 216 corresponding to that RSSI or TOF can be eliminated from the vehicle 110 without changing results. An insignificant change in 3D location in the present context means a change of less than 10 centimeters in the squared and summed differences in each of x, y, and z coordinates. Reducing the number of antennas required to determine the 3D location of a mobile device 202 can reduce the cost, weight, and complexity of a vehicle 110.

Figure 3:
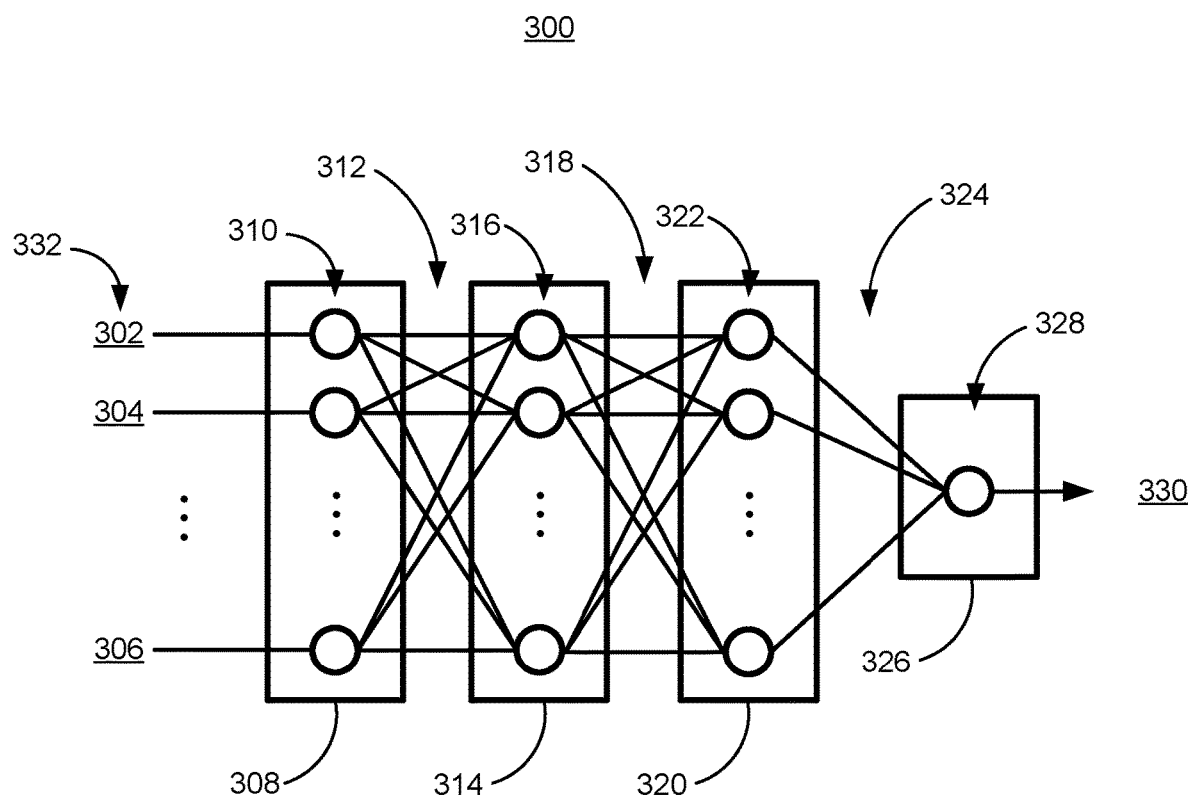
FIG. 3 is a diagram of an example deep neural network.

FIG. 3 is a diagram of a neural network 300. A neural network 300 is a software program that can execute on a computing device 115 included in a vehicle 110, for example. Neural network 300 includes an input layer 308, intermediate fully-connected layers 314, 320, and an output layer 326. Neural network 300 can input a plurality of RSSIs or TOFs 302, 304, 306 (collectively RSSIs or TOFs 332) produced by antennas 216 to input layer 308, where the ellipsis dots correspond to additional RSSIs TOFs that could be included in the input. Each RSSI or TOF 332 is input to an input node 310 in input layer 308. Input nodes 310 input the RSSIs or TOFs 332 and prepares the input RSSIs or TOFs 332 for further processing by conditioning the input RSSIs or TOFs 332. Conditioning the input RSSIs or TOFs 332 can include mapping the input RSSIs or TOFs 332 onto the interval [0,1] as discussed above in relation to a rule-base system. Once the input RSSIs or TOFs 332 are conditioned, they can be communicated as first hidden variables 312 to a first fully-connected layer 314. First hidden variables 312 are referred to as "hidden variables" because they are not typically available for inspection outside of the neural network 300 during processing. First hidden variables 312 are communicated to first fully-connected intermediate nodes 316 of first fully-connected intermediate layer 314. Each first fully-connected intermediate node 316 receives input from each input node 310, hence the name "fully-connected". Each first fully-connected intermediate node 316 performs a parameterized calculation of a portion of a set of simultaneous linear equations based on polynomial inverse square-law functions as illustrated in equation (5), above. The parameters correspond to values that determine a solution for the simultaneous linear equations based on the conditioned RSSIs or TOFs 332 corresponding to equation (5) above.

Portions of the simultaneous linear equations corresponding to equation (5) are determined by first fully-connected intermediate nodes 316 of first fully-connected layer 314 and transmitted as second hidden variables 318 to second fully-connected intermediate nodes 322 of second fully-connected intermediate layer 320. The second fully-connected intermediate nodes 322 determine a second portion of a solution for the simultaneous linear equations based on equation (5), above, based on a second set of parameters. The results of processing the input RSSIs 332 by the second fully-connected intermediate nodes 322 of the second fully-connected intermediate layer 320 are communicated as third hidden variables 324 to an output node 328 included in output layer 326. The intermediate layers 314, 320 map data from the input nodes 310 into hidden variables 324 corresponding to a 3D location based on the polynomial simultaneous linear equations based on equation (5). Output node 328 combines the third hidden variables 324 corresponding to a solution to the simultaneous linear equations based on inverse-square law functions from equations (1)-(5) according to a third set of parameters into an output state 330 corresponding to a 3D location of a mobile device 202 with respect to a vehicle 110. The 3D location of a mobile device 202 with respect to a vehicle 110 can be encoded in output state 330 as a zone and a probability that the mobile device 202 occupies the zone. A zone is a 3D volume in space defined with respect to the 3D locations of the antennas 216. For example, a zone can be defined to encompass a volume of space within one meter of the front, left-hand vehicle 110 door. Another zone can be defined to encompass a 3D volume behind the vehicle, near the trunk or tailgate, for example.

Neural network 300 can be trained to determine a solution to a set of simultaneous linear equations similar to equation (5) corresponding to a 3D location of a mobile device 202 with respect to a vehicle 110. This training can be achieved by recording a large number (>100) of sets of RSSIs or TOFs 332 corresponding to a plurality of 3D locations of a mobile device 202 with respect to a vehicle 110. Each set of RSSIs or TOFs 332 is accompanied by a ground truth 3D location. The ground truth 3D location is determined by performing real-world 3D measurements of the 3D location of a mobile device 202 with respect to a vehicle 110. The plurality of 3D locations of a mobile device 202 with respect to a vehicle 110 corresponds to the variety of zones that would be encountered when operating a vehicle 110 using a mobile device 202 in real-world situations. The variety of zones can include approaching a vehicle 110 from any direction, at a variety of heights with respect to a ground plane, where the mobile device 202 is at a variety of positions with respect to a user. For example, the mobile device and be in a user's hand, in a pocket of a user's garment, or in a purse or backpack, etc. The mobile device 202 can be stationary or moving with respect to the vehicle 110 at the time the RSSIs 332 are recorded. The ground truth corresponding to the RSSIs or TOFs 332 will correspond to a 3D location or average 3D location of the mobile device 202 at the time the RSSIs or TOFs 332 are recorded.

A neural network 300 can be trained to determine a location in a defined zone for a mobile device 202 by inputting a set of RSSIs or TOFs 332, and randomly (or pseudo-randomly) selecting a set of first, second, and third parameters to solve a set of simultaneous linear equations and form an output state 330. The zone included in output state 330 is back propagated and compared to the ground truth by determining if the measured 3D location of the mobile device 202 is within the zone. If the measured location of the mobile device 202 does not fall within the zone, the first, second, and third parameters are varied, and a new solution is determined as output state 330 to be compared to the ground truth. This process is continued until one or more sets of first, second, and third parameters are determined that produce an output state 330 that accurately matches the ground truth. A probability corresponding to the zone matching the ground truth can be determined by measuring a distance between the center of the 3D volume corresponding to the zone and the 3D location included in the ground truth. The accuracy can be measured by a sum of squared differences in x, y, and z dimensions to determine a probability that the 3D location of the mobile device 202 is included in the zone.

The process of matching backpropagated results with ground truth is then repeated for each set of RSSIs or TOFs 332 and corresponding ground truth until a set of first, second, and third parameters are determined that produce zones and probabilities that match the ground truth for each set of RSSIs or TOFs 332. The set of first, second, and third parameters that cause the output states 330 to match the ground truth can be downloaded to a neural network 300 to program it to determine 3D locations for a mobile device with respect to a vehicle 110 when a set of RSSIs or TOFs 332 is input to the neural network 300.

Neural network 300 can include fewer or more layers than input first and second fully-connected layers 314, 320, depending upon how the simultaneous linear equation calculations are divided between layers. In some examples of neural network 300, a one-to-one correspondence between input RSSIs or TOFs 332 and input nodes 310 be maintained. In other examples one or more input RSSI or TOF 332 can be input to more than one input node 310, to permit a single RSSI or TOF 332 to be processed differently than other RSSIs or TOFs 332. For example, inputting a single RSSI or TOF 332 to two input nodes 310 can cause a single RSSI or TOF to have more weight or importance in solving the simultaneous linear equations than other RSSIs or TOFs 332. In other examples, two or more RSSIs or TOFs 332 can be input to a single input node 310. For example, two or more antennas 216 can produce highly correlated RSSIs or TOFs regardless of where a mobile device 202 is located with respect to a vehicle 110. In this example the input of either RSSI or TOF 332 to a single input node 310 can have the same result.

Training a neural network 300 to determine a 3D location of a mobile device 202 with respect to a vehicle 110 can improve a 3D location process by eliminating the time-consuming and error-prone task of testing and modifying each rule in a rule-based system for each possible 3D location of a mobile device 202 including the variety of locations that a mobile device can assume with respect to a user. Using a trained neural network 300 to determine a 3D location of a mobile device 202 can also permit rapid and accurate optimization of antennas 216. Input RSSIs or TOFs 332 can be eliminated one at a time and a second neural network 300 can be trained to determine new 3D locations. The new 3D locations can be compared to the old 3D locations determined with a full complement of RSSIs or TOFs 332 to determine whether a particular antenna 216 is redundant, for example.

Neural network 300 output state 330 can include one or more zones and probabilities. The zones are defined by distances $d_n$ from an antenna 216 to a center of a zone in x, y, and z coordinates. Each zone is identified by a number 1, . . . , n. The zone identity numbers correspond to a 3D location of the zone measured from a single point on the vehicle 110 and stored at a computing device 115. The computing device 115 can receive the output states 330 and use the zone numbers to look up the measured 3D location of the zone with respect to one or more antennas 216 and add it to the corresponding probability from the output state 330 to determine the 3D distance of the mobile device 202 from a predetermined point on the vehicle 110. The predetermined point on the vehicle can be the geometric center of the vehicle 110 or a point on the exterior of the vehicle 110, for example the left-hand front door, for example.

Figure 4:
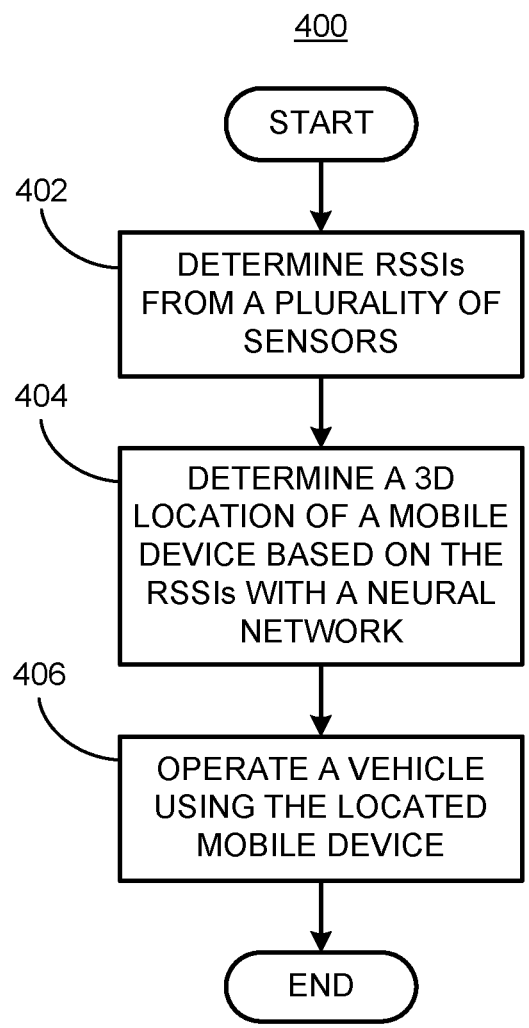
FIG. 4 is a is a flowchart diagram of an example process to operate a vehicle based on a trained deep neural network.

FIG. 4 is a flowchart diagram of a process 800 described in relation to FIGS. 1-7, of a process 400 for operating a vehicle based on determining a 3D location and identity of an object. Process 800 can be executed by a processor of computing device, taking as input information from sensors, and providing commands and/or outputting object information, for example. Process 800 includes multiple blocks that can be executed in the illustrated order. Process 800 could alternatively or additionally include fewer blocks or can include the blocks executed in different orders.

Process 400 begins at block 402, where RSSIs or TOFs 332 are determined based on signals acquired from antennas 216 included in a vehicle 110. The RSSIs or TOFs are acquired by receiving signals from a mobile device 202. The signals can be received from a mobile device 202 in response to a signal transmitted from a vehicle 110. This can permit a computing device 115 in a vehicle 110 to sample received signals from a plurality of antennas 216 at the same time, for example. This can also permit a computing device 115 in a vehicle to identify a mobile device 202 by transmitting a pre-determined code and requesting a pre-determined code to be returned by a mobile device 202. In this fashion a secure connection can be established between a vehicle 110 and a mobile device 202, thereby permitting only mobile devices 202 that have been previously programmed to transmit the predetermined code to operate the vehicle 110.

At block 404 the RSSIs or TOFs 332 are input to a neural network 300 to determine a 3D location for a mobile device 202 with respect to a vehicle 110. The neural network 300 has be trained to locate a mobile device 202 as discussed above in relation to FIG. 3 based on an output zone and probability. The 3D location of the mobile device 202 includes a direction and distance of the mobile device 202 measured with respect to a location on a vehicle 110 based on the output zone and probability. The vehicle 110 location can be a location on the exterior of the vehicle 110, for example a location on a right or left front door.

At block 406 a computing device 115 in a vehicle 110 can perform an operation based on the determined 3D location of the mobile device 202. The operation to be performed can be selected based on rule-based logic. For example, the rule-based logic can include a rule such as: "IF a mobile device 202 is within a zone corresponding to the front, left-hand door AND the probability is greater than 50% AND the mobile device 202 has transmitted a code that matches a predetermined code stored at the computing device 115, THEN unlock the front, left-hand door". The computing device 115 can also turn on vehicle 110 lights when a mobile device 202 is identified as being within any zone that corresponds to a predetermined distance, for example 1 meter, from the vehicle 110. These lights can assist a user in locating a door to enter a vehicle 110, for example. Another operation that can be performed by computing device 115 in response to 3D locations of a mobile device include locking vehicle 110 doors when the computing device 115 determines that the mobile device 202 is located in a zone corresponding to a distance more than one meter from the vehicle 110 with a probability of greater than 50%. The computing device 115 can also disable vehicle locks when the computing device 115 determines that the 3D location of the mobile device 202 is in a zone corresponding to the inside the vehicle 110, thereby preventing the mobile device 202 from being locked inside the vehicle 110. Following block 406 process 400 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a processor and a memory, the memory including instructions executable by the processor to:
    determine a plurality of received signal strength indicators for a mobile device from each of a plurality of sensors included in a vehicle;
    determine a location of the mobile device with respect to the vehicle by processing the received signal strength indicators with a machine learning neural network, wherein each received signal strength indicator is input to an input neuron included in an input layer of the machine learning neural network wherein each input neuron receives as input at least one received signal strength indicator;
    wherein the plurality of sensors is optimized by determining an accuracy of the determined location compared to corresponding ground truth data when one or more of the sensors are deleted from the machine learning neural network processing, and wherein the machine learning neural network is trained by acquiring a data set including the plurality of received signal strength indicators from the plurality of sensors and the corresponding ground truth data regarding the location of the mobile device wherein the ground truth data includes a location in three-dimensional space of the mobile device with respect to the vehicle; and
    operate the vehicle using the located mobile device.

2. The computer of claim 1, wherein each of the sensors includes an antenna located at a position on and in the vehicle.

3. The computer of claim 1, wherein the machine learning neural network outputs a 3D distance as a zone and a probability that the mobile device is in the zone, wherein the zone is a 3D volume defined with respect to the 3D locations of the antennas.

4. The computer of claim 3, wherein the machine learning neural network outputs two or more zones and corresponding probabilities.

5. The computer of claim 1, wherein each input neuron inputs one and only one received signal strength indicator.

6. The computer of claim 1, wherein an input neuron inputs two or more received signal strength indicators based on the two or more received signal strength indicators including highly correlated signals.

7. The computer of claim 1, wherein intermediate layers of the machine learning neural network include intermediate neurons that map data from the input neurons into a three-dimensional location based on polynomial functions.

8. The computer of claim 7, wherein the polynomial functions are based on inverse-square law functions that determine distances based on the received signal strength indicators.

9. The computer of claim 1, the instructions including further instructions to determine the received signal strength indicators by transmitting a signal requesting a reply to the mobile device and measuring a signal received from the mobile device in reply.

10. The computer of claim 1, wherein operating the vehicle includes one or more of turning on vehicle lights and unlocking the vehicle, and opening a tailgate when the mobile device is determined to be within a specified distance from the vehicle.

11. The computer of claim 1, wherein operating the vehicle includes disabling a lock of the vehicle when the mobile device is determined to be inside the vehicle.

12. The computer of claim 1, wherein operating the vehicle includes locking the vehicle when the mobile device is determined to be more than a specified distance away from the vehicle.

13. A method, comprising: determining a plurality of received signal strength indicators for a mobile device from each of a plurality of sensors included in a vehicle; determining a location of the mobile device with respect to the vehicle by processing the received signal strength indicators with a machine learning neural network, wherein each received signal strength indicator is input to an input neuron included in an input layer of the machine learning neural network wherein each input neuron receives as input at least one received signal strength indicator; wherein the plurality of sensors is optimized by determining an accuracy of the determined location compared to corresponding ground truth data when one or more of the sensors are deleted from the machine learning neural network processing, and wherein the machine learning neural network is trained by acquiring a data set including the plurality of received signal strength indicators from the plurality of sensors and the corresponding ground truth data regarding the location of the mobile device wherein the ground truth data includes a location in three-dimensional space of the mobile device with respect to the vehicle; and operating the vehicle using the located mobile device.

14. The method of claim 13, wherein each of the sensors includes an antenna located at various positions on and in the vehicle.

15. The method of claim 13, wherein the machine learning neural network outputs a 3D distance as a zone and a probability that the mobile device is in the zone, wherein the zone is a 3D volume defined with respect to the 3D locations of the antennas.

16. The method of claim 15, wherein the machine learning neural network outputs two or more zones and corresponding probabilities.

17. The method of claim 13, wherein each input neuron inputs one and only one received signal strength indicator.

18. The method of claim 13, wherein an input neuron inputs two or more received signal strength indicators based on the two or more received signal strength indicators including highly correlated signals.

19. The method of claim 13, wherein intermediate layers of the machine learning neural network include intermediate neurons that map data from the input neurons into a three-dimensional location based on polynomial functions.

20. The method of claim 13, wherein the polynomial functions are based on inverse-square law functions that determine distances based on the received signal strength indicators.

* * * * *